G. N. HINCHMAN.
ADDING MACHINE.
APPLICATION FILED OCT. 24, 1907.

899,398.

Patented Sept. 22, 1908.
5 SHEETS—SHEET 1.

WITNESSES:
W. A. Alexander.
L. L. Mead.

INVENTOR
G. N. Hinchman.
BY
Fowler H Bryson
ATTORNEY

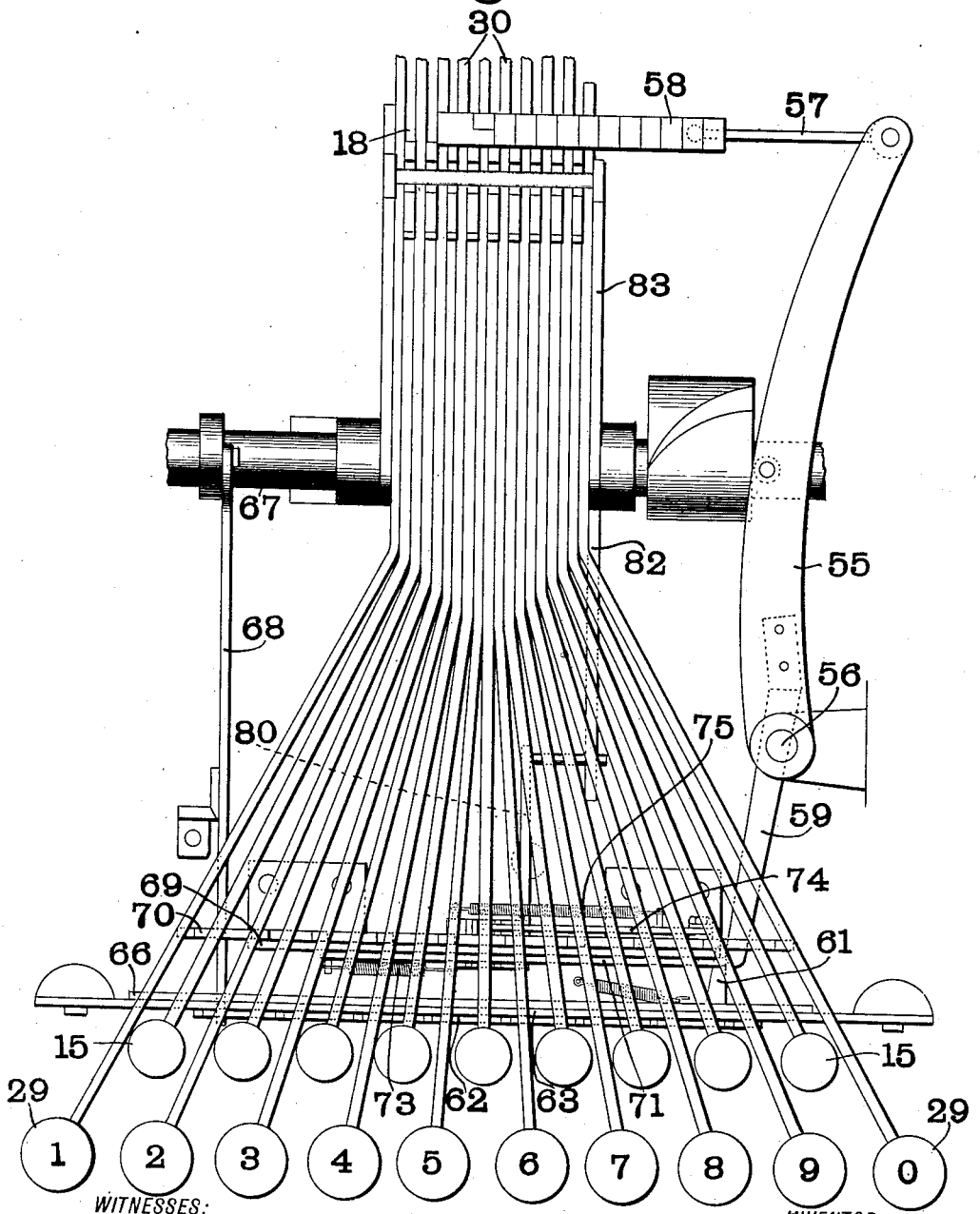

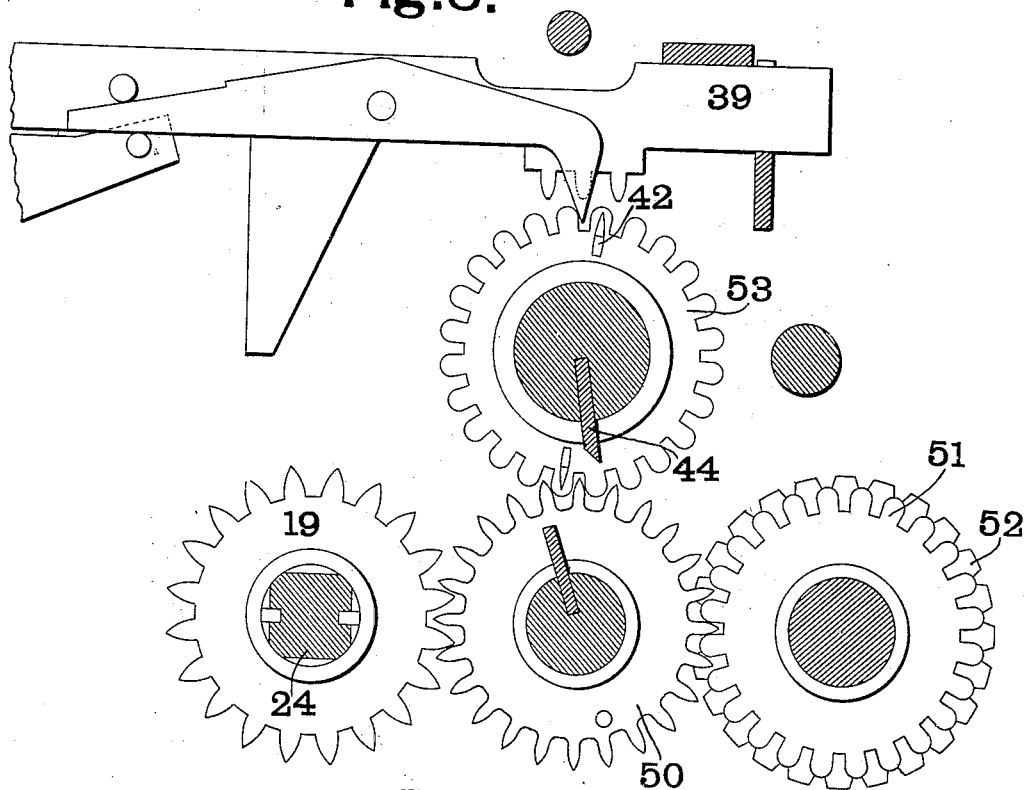
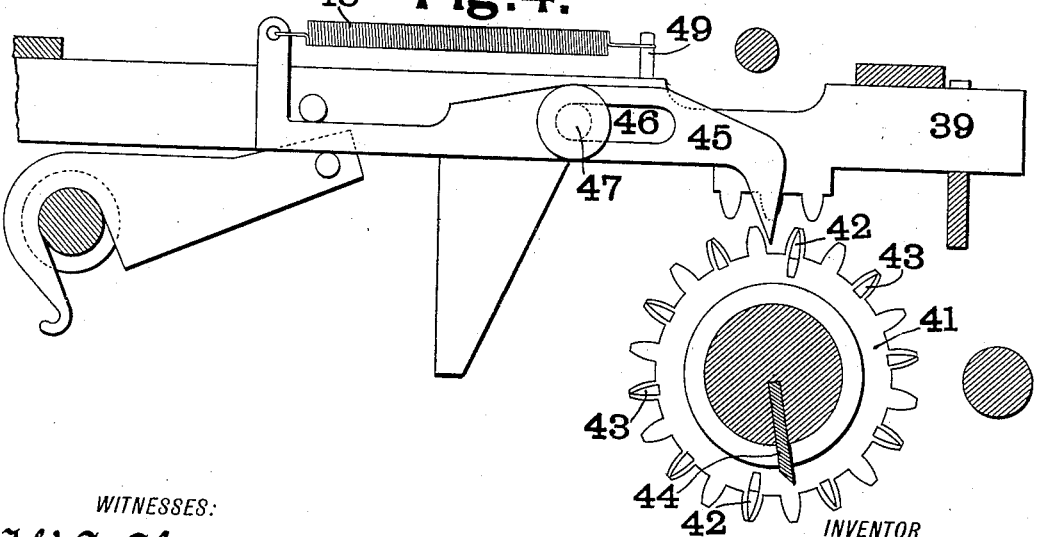

G. N. HINCHMAN.
ADDING MACHINE.
APPLICATION FILED OCT. 24, 1907.

899,398.

Patented Sept. 22, 1908.
5 SHEETS—SHEET 4.

WITNESSES:
W. A. Alexander.
L. L. Mead.

INVENTOR
G. N. Hinchman.
BY
Fowler H Bryson
ATTORNEY

G. N. HINCHMAN.
ADDING MACHINE.
APPLICATION FILED OCT. 24, 1907.

899,398.

Patented Sept. 22, 1908.
5 SHEETS—SHEET 5.

WITNESSES:
W. A. Alexander.
L. L. Mead.

INVENTOR
G. N. Hinchman.
BY
Fowler H Bryson
ATTORNEY

UNITED STATES PATENT OFFICE.

GEORGE N. HINCHMAN, OF WEBSTER GROVES, MISSOURI.

ADDING-MACHINE.

No. 899,398.　　　Specification of Letters Patent.　　　Patented Sept. 22, 1908.

Application filed October 24, 1907. Serial No. 399,018.

*To all whom it may concern:*

Be it known that I, GEORGE N. HINCHMAN, a citizen of the United States, residing at Webster Groves, in the county of St. Louis and State of Missouri, have invented certain new and useful Improvements in Adding-Machines, of which the following is such a full, clear, and exact description as will enable any one skilled in the art to which it appertains to make and use the same, reference being had to the accompanying drawings, forming part of this specification.

My invention relates to improvements in adding machines and more particularly to improvements in that type of adding machines shown and described in Letters Patent No. 683,939 granted to William W. Hopkins, Oct. 8, 1901. Many of the features of my invention, however, are adapted to use in connection with adding machines of different types.

The object of my invention is to adapt adding machines of the type above referred to or of similar types to use in connection with numbers, the various orders or denominations of which do not bear a decimal relation to each other. In the present instance I have shown a machine adapted for adding the pounds, shillings and pence of the British monetary system. It is evident, however, that with slight changes a machine made in accordance with my invention may be adapted for adding various other quantities, such for instance, as yards, feet and inches or tons, pounds and ounces.

Figure 1:
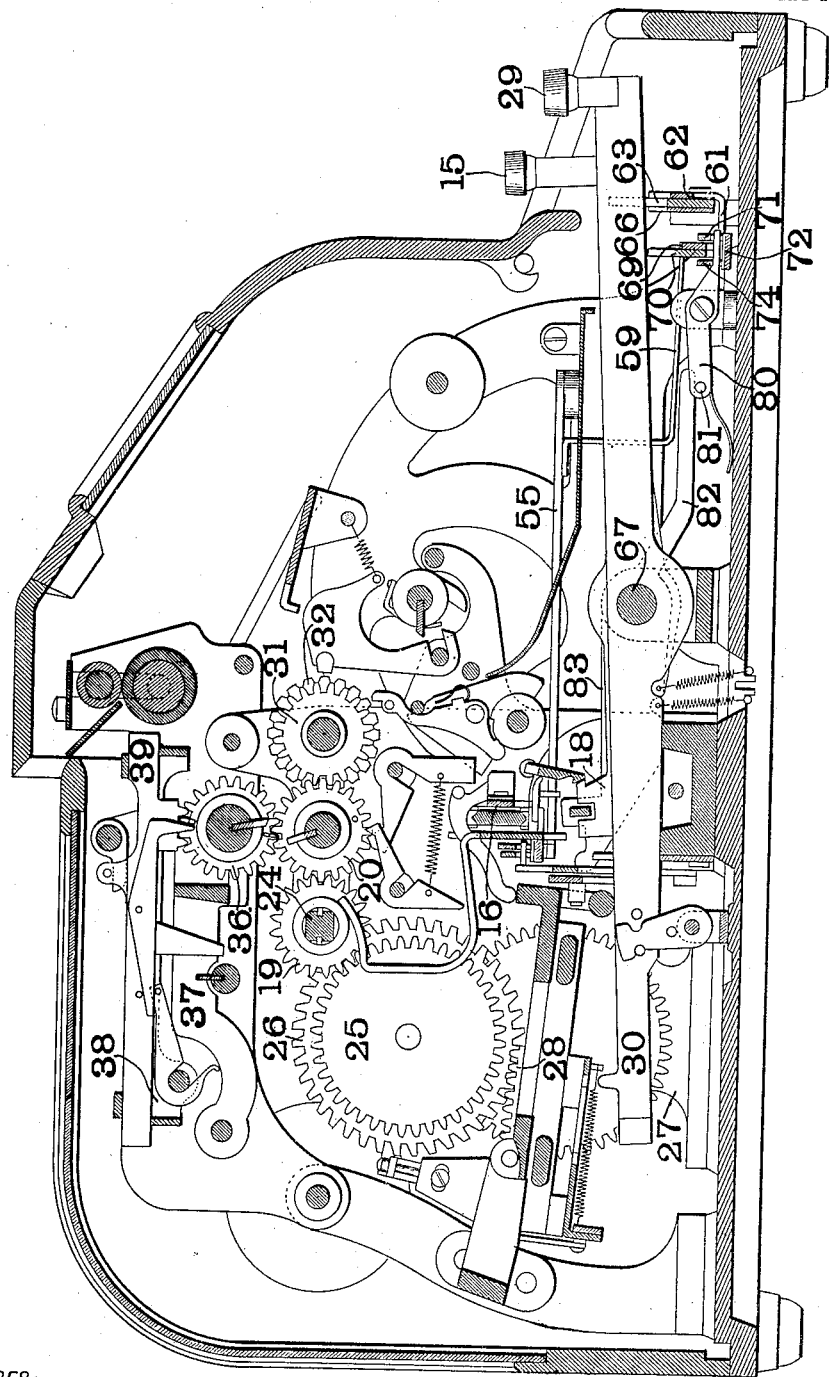
Figure 5:
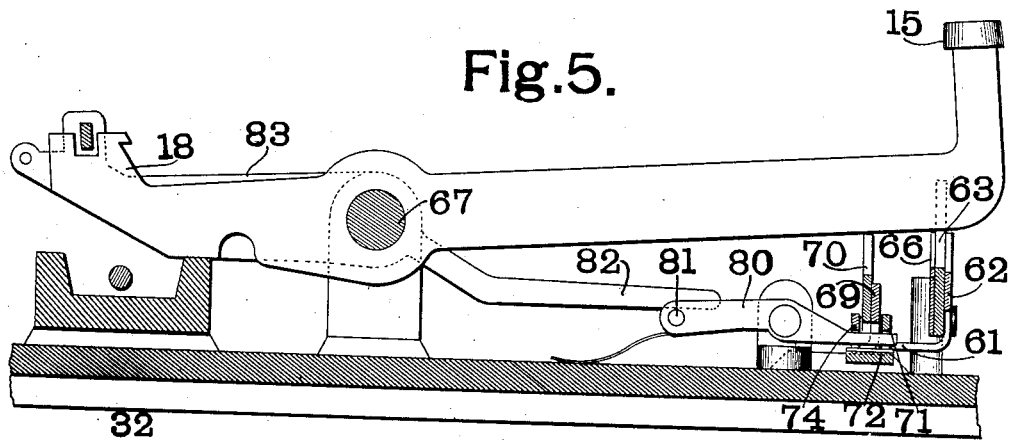
Figure 6:
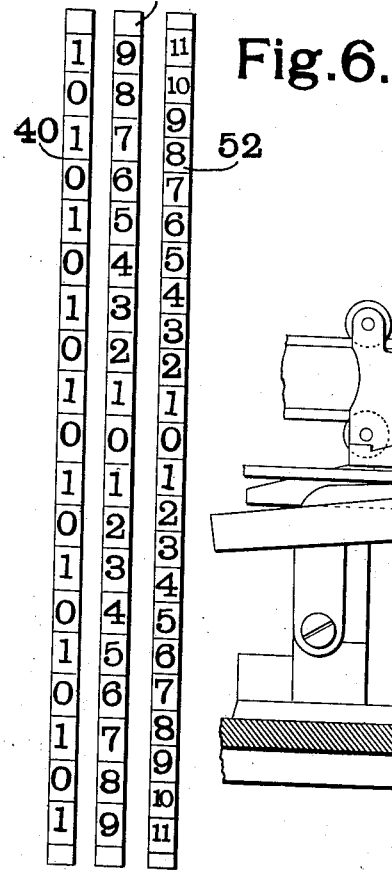
Figure 7:
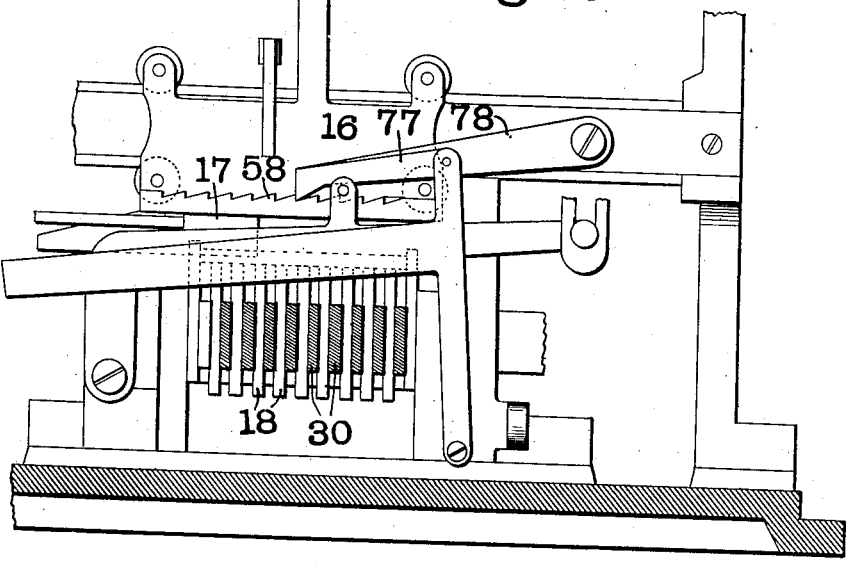
Figure 8:
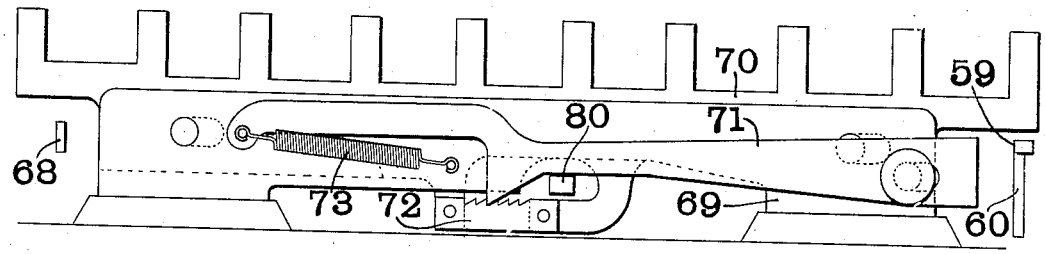
Figure 9:
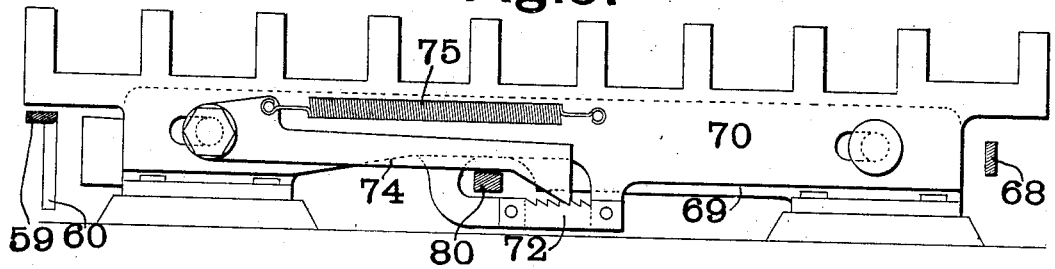
Figure 10:
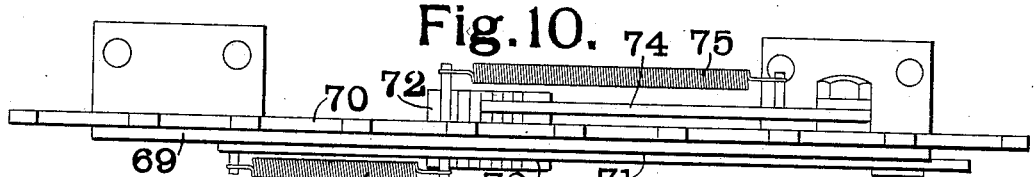
Figure 11:
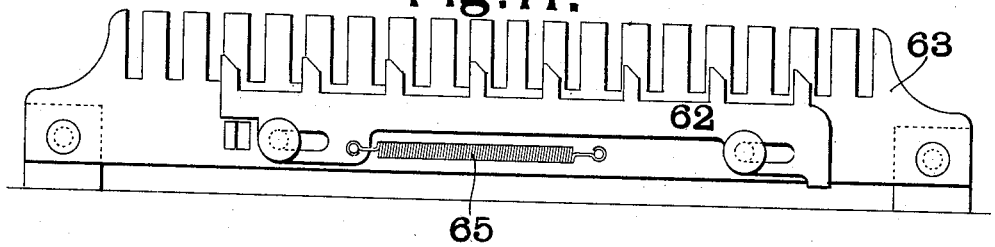

In the accompanying drawings which illustrate one form of adding machine made in accordance with my invention, Figure 1 is a central vertical section of the complete machine; Fig. 2 is a top plan view of the key bars and adjacent parts; Fig. 3 is an enlarged sectional view of the adding, printing and carrying mechanism in the pence order of the machine; Fig. 4 is an enlarged view of the adding and carrying mechanism in the left hand shillings order of the machine; Fig. 5 is a sectional view showing the order key bars and locks for the same; Fig. 6 is a development of the three right hand printing wheels; Fig. 7 is an end elevation of the carriage and adjacent parts; Fig. 8 is an enlarged view of one of the locks for the numeral keys; Fig. 9 is a view similar to Fig. 8 but looking from the opposite direction; Fig. 10 is a top plan view of the parts shown in Figs. 8 and 9 and Fig. 11 is a front elevation of another lock for the numeral keys.

Like marks of reference refer to similar parts in the several views of the drawings.

The main parts of the machine are similar to the parts shown and described in the patent to Hopkins above referred to and need not be described in detail.

The general operation of the machine is as follows: In writing a number in the machine, one of the order keys 15 corresponding with the left hand order in the number to be written into the machine, is depressed. The depression of this key releases the carriage 16 and at the same time throws into the path of the stop 17 on said carriage the rear end of the order key bar 18. The depression of the key thus positions the carriage 16 in the proper place to begin the registration of the number. The positioning of the carriage 16 also positions the sliding gear 19 so that said gear meshes with an intermediate gear 20 in the order corresponding to the left hand digit of the number to be written. This gear 19 slides on a shaft 24 which is driven from a wheel 25 connected through an escapement wheel 26 with a spring motor 27. The amount of movement of the wheels 25 and 26 is determined by a rack 28 adapted to be thrown into engagement with the wheel 25 by means of the numeral keys 29. The rear ends of the numeral key bars 30 determine the amount of movement of the rack 28, as is fully described in the Hopkins patent above referred to, so that when one of the numeral keys 29 is depressed the sliding gear 19 is rotated through a distance corresponding to the numeral key depressed.

The intermediate wheel 20 above referred to meshes with a spur wheel 31 rigidly attached to a printing wheel 32 and with an adding wheel 36. The adding wheel 36 is carried by a frame 37 so that it may be moved into and out of mesh with the wheel 20. A second pivoted frame 38 is provided with carrying bars 39 adapted to engage with the wheels 36 when it is necessary to carry a unit in one order from the next lower order. After the carriage 16 has been positioned as above described so as to bring the sliding gear 19 into engagement with the proper intermediate gear 20 the said intermediate gear stands in mesh with its corresponding gear 31 and the corresponding adding wheel 36. The frame 38, however, is moved into such position as to hold the carrying bars 39 out of engagement with the said adding wheel 36. When a numeral key is depressed the corresponding printing wheel will thus be positioned to print the proper digit and the corresponding adding wheel will be moved through a distance corresponding to the same digit. As each successive numeral key is depressed the sliding gear 19 is moved step by step toward the right of the machine so as to successively position the different printing and adding wheels. When the writing of the number is completed the machine is operated through the usual handle to return the various intermediate and printing wheels to zero position. The adding wheels 36 however, are lifted out of engagement with the intermediate wheels so that the number remains in the adding wheels and at the same time the adding wheels are brought into engagement with the carrying bars 39 so as to carry forward one in any order in which said carrying bars have been positioned to carry.

The parts above described are similar in construction and operation to those shown in the patent to Hopkins above referred to and are only illustrated and described to enable the operation of my improvements to be clearly understood. In all the orders in the machines in which ten units make one unit of the next higher denomination, intermediate adding and printing wheels are like those above described. In the shillings order, however, twenty units are required to make one pound. In order to adapt the machine for adding shillings I provide the machine with two wheels for shillings, the right hand one of which is like the wheels in the ordinary denominations. In the left hand order, however, the wheels differ as will be hereinafter more fully described. In the pence order of the machine twelve units are required to make one of the next higher denomination and in this order I use but a single wheel and adapt the same to be operated twice in succession when 10 or 11 pence are to be added. From this it will be seen that in adapting the machine for the British monetary system only two of the orders need be changed from the ordinary construction used in adding decimal numbers.

In the left hand shillings order the intermediate wheel 20 is of the usual construction. It meshes with a printing wheel 40 which is shown developed in Fig. 6 and which differs from the ordinary printing wheels in that it is supplied only with the characters one and zero. The adding wheel 41 with which this intermediate wheel meshes is provided with the same number of teeth as the adding wheels 36, namely, twenty. In place, however, of only being supplied with two carrying teeth or lugs 42, as are the other wheels, it is provided with additional carrying teeth 43 so that its corresponding carrying bar will be tripped whenever it is moved through a distance of two teeth. These additional carrying teeth 43, however, do not extend inwardly a sufficient distance to engage with the comb 44 for returning the wheel to zero. The carrying pawl 45 upon the carrying bar 39 corresponding to the wheel 41 is slidingly mounted upon the said bar 39, as shown in Fig. 4. The pawl 45 is provided with a slot 46 through which passes a pin 47 provided with an enlarged head for holding the pawl in position. The pawl 45 is normally held in its forward position by means of a spring 48 attached at one end to said pawl and at the other to a pin 49 in the carrying bar 39. This sliding mounting of the pawl 45 allows the pawl to move backwardly out of the path of the extra carrying teeth 43 of the wheel 41 when the said wheel is returned to zero position by the comb 44.

The intermediate wheel 50 on the right hand or pence order differs from the intermediate wheels 20 on the other orders in that it is provided with twenty-four teeth in place of twenty. In order, however, that the sliding gear 19 may mesh with this intermediate gear in the same manner as with the other gears 20, this gear 50 must be made of approximately the same diameter as the gears 20. It must also mesh with the gear 19. It is thus seen that gears of approximately the same diameter having a different number of teeth and consequently different pitches, must mesh together. This cannot be accomplished with the ordinary form of gearing and I have therefore devised a form of gearing shown in detail in Fig. 3. As will be seen in this figure the teeth of the gear 50 are much narrower than the teeth of the gear 19 with which it meshes. The gear 50 must also mesh with a gear 51 carrying a printing wheel 52 on the right hand or pence order, and also with the adding wheel 53 on the said order. These gears 51 and 53 must contain twenty-four teeth each like the gear 50. It is evident that the gear 50 will not mesh with a gear of equal size having twenty-four teeth if the teeth be either made in the ordinary way or similar to the teeth of the gear 50. I have, therefore provided the said gears 51 and 53 with the form of teeth shown in Fig. 3 of the drawings, said teeth being wider than the ordinary teeth and rounded at the ends. I find that with this form of gears the gear 50 will run both with the gear 19 having a less number of teeth and with the gears 51 and 53 having an equal number of teeth. The printing wheel 52, shown developed in Fig. 6, is provided with digits from zero to 11. As the numeral keys 29 of the machine are only 9 in number it is evident that the machine must be operated twice in the pence order when 10 or 11 pence are to be added. It is also evident that in the left hand shillings order means must be provided for preventing the numeral keys above the 1 key from being depressed as the printing wheel in said order is provided only with the characters 0 and 1. The mechanism for accomplishing this together with the mechanism for allowing the machine to feed twice in the pence order will now be described.

55 is a pivot-arm carried on the frame of the machine at 56 and having its rear end attached by means of a rod 57 to the feed rack 58 on the carriage 16 so that the said arm 55 must move with the carriage 16. The arm 55 has a forwardly projecting lever 59 provided with a downwardly projecting pin 60. This pin 60 is adapted to come into contact with a finger 61 projecting rearwardly from a sliding comb 62 mounted on a fixed comb 63 and arranged below the key bars of the order and numeral keys. This sliding comb 62 is provided with eight teeth so that when moved a slight distance by the pin 60 the said teeth will be moved under the numeral key bars and lock all said bars against movement except the bars of the 1 and 0 keys. When, however, the comb is moved slightly farther the teeth of the said comb will be moved from in under the key bars and will not interfere with their depression. The object of this comb is to lock the keys except the 1 and 0 keys when the carriage of the machine is in the left hand shillings column. The comb is held in its normal position when the finger 61 is out of contact with the pin 60, by means of a coil spring 65. Slidingly mounted on the rear face of the fixed comb 63 is a second sliding comb 66 which is operated from the handle shaft 67 by means of a lever 68 in the usual manner so as to lock all the keys, both numeral and order, when the handle is in its forward position.

Carried at the rear of the fixed comb 63 is a plate 69 on which is slidingly mounted a comb 70. This comb 70 is provided with ten teeth for locking the nine numeral keys and the 0 key. These teeth, however, are so arranged that upon the first movement of the comb only eight of the keys are locked, the 1 and 2 key being left free to move. When, however, the comb is moved a slightly greater distance, all the keys will be locked against movement. The movement of the comb 70 is caused by means of a feed pawl 71 slidingly mounted on the plate 69 and engaging with a rack 72 carried by the comb 70. This feed pawl 71 projects beyond the plate 69 as shown in Figs. 8 and 9 and is adapted to be struck by the lever 59 carried on the pivoted arm 55 and hereinbefore described. The feed pawl 71 is normally held in its retracted position by means of a coil spring 73 secured at one end to said feed pawl and at the other to the plate 69. The comb 70 is fed towards the left through a distance of one tooth when the number of pence in the number to be recorded is 9 or less, and through a distance of two teeth when the number of pence is 10 or 11. In order to retain the comb 70 in position after it has been fed to the left I pivot to the opposite side of the plate 69 a retaining pawl 74. This pawl 74 is normally held in engagement with the rack 72 by means of a coil spring 75 secured at one end to said pawl and at the other to the comb 70. As has been hereinbefore stated, it is necessary to have the carriage of the machine remain in the right hand or pence order while the key-board is twice operated. This is accomplished by means of mechanism which will be hereinafter described. The result of such feeding twice in the right hand order is that after the arm 59 has come into contact with the feed pawl 71 and fed the comb 70 a distance of one tooth toward the left so as to lock all the numeral keys except the 1 and 2, the 1 and 2 keys only can be operated for the second time in the said order, after which the arm 59 retreats a slight distance so as to allow the feed pawl 71 to retreat one tooth and then again feeds forward and moves the comb 70 a farther distance so as to lock all the numeral key bars as is shown in Fig. 2. This latter position of the comb locking all the key bars performs the function of the end of the line lock shown in the Hopkins patent above referred to, as such lock cannot be used in a machine in which the key-board is operated twice while the carriage remains in the last order. In order to allow the carriage of the machine to remain in the last order while the key-board is twice operated the left hand tooth of the feed rack 58 on the carriage extends only half way across the rack as is shown in Fig. 2. The rack is fed forward by means of a feed pawl 77 and is prevented from returning by means of a retaining pawl 78. When, however, the last order is reached the portion of the teeth which would be engaged by the retaining pawl 78 being omitted the carriage will return to its former position and this could be continued indefinitely but for the locking device hereinbefore described.

The locking device hereinbefore described must be released before the registration of a new number can be begun. In order to accomplish this releasing I provide a lever 80, Figs. 2 and 5, which projects below the feed pawl 71 and retaining pawl 74 engaging with the rack 72. When this lever 80 is rocked on its pivot it releases both of these pawls from the rack 72 so that the spring 75 may return the comb 70 to its normal position and leave all the keys free to be operated. The rear end of the lever 80 is provided with a pin 81 upon which bears the forward end of an arm 82 carried by a cradle 83 which is rocked upon the operation of one of the order keys 15.

The operation of the various locking devices is as follows: When the carriage is positioned to begin a registration of the number the arm 59 is moved toward the right and away from the various locking devices. As the carriage is moved step by step towards the right hand end of the machine by the operation of the various numeral keys the arm 59 is moved toward the left until when the left hand shillings order is reached the pin 60 on said arm 59 comes in contact with the finger 61 and moves the comb 62 in such position that only the 1 and 0 keys can be operated. If the amount of shillings is from 1 to 9 the 0 key is now operated to move the carriage into the next order or right hand column of shillings. If, however, the number is between 11 and 19 the 1 key is depressed to add 1 in the left hand shillings column. After either the 1 or 0 key is depressed the further movement of the arm 59 moves the comb 62 farther towards the left hand end of the machine and thus releases all of the keys so that in the right hand shillings column any of the numeral keys may be depressed to add from 1 to 9. The further movement of the carriage into the next or pence order brings the arm 59 into contact with the end of the feed pawl 71 and thus feeds the comb 70 a distance to the left equal to one tooth of the rack 72 so that after the machine has been operated once in the pence column all the numeral keys except the 1 and 2 are locked. In case the number of pence has been 9 or less this will complete the registration of the number. In case, however, the number of pence is 10 or 11, the 9 key will be depressed the first time in this order and then the 1 or the 2 key. When the machine is operated the second time in the order the arm 59 will retreat and again move forward so as to move the comb 70 toward the left a distance equal to two teeth on the rack 72 and thus lock all the numeral keys which keys will then remain in this position until the order keys are unlocked by the pull of the handle and in turn by their operation unlock the numeral keys by releasing the pawls 71 and 74 as has been hereinbefore described.

Having fully described my invention, what I claim as new and desire to secure by Letters Patent of the United States is:

1. In an adding machine, the combination with adding wheels, of a wheel adapted to mesh therewith, said wheels differing both as to the width of their teeth and the spaces between the teeth, numeral keys, and means for controlling said second wheel from said numeral keys.

2. In an adding machine, the combination with an adding wheel, of a wheel adapted to mesh therewith, said wheels differing both as to the width of their teeth and the spaces between the teeth, and also differing as to the contour of their teeth, numeral keys, and means for controlling said second wheel from said numeral keys.

3. In an adding machine, the combination with an adding wheel, of a wheel adapted to mesh therewith but differing therefrom in the contour of its teeth, a third wheel engaging with said second wheel and differing in the contour of its teeth from both of said first named wheels, numeral keys, and means for controlling said third wheel from said numeral keys.

4. In an adding machine, the combination with a plurality of gears approximately of the same diameter but having different numbers of teeth, of a toothed member successively engaging directly with said gears, keys controlling the movement of said toothed member, and adding mechanism operated from said gears.

5. In an adding machine, the combination with a plurality of gears of approximately the same diameter but having different numbers of teeth, of a toothed member adapted to coöperate directly with said gears, said toothed member engaging with a part of said gears on its pitch line and with another part of said gears beyond its pitch line, numeral keys, and means for controlling said toothed member from said numeral keys.

6. In an adding machine, the combination with a plurality of gears of approximately the same diameter but having different numbers of teeth, of a toothed member adapted to coöperate directly with said gears, said toothed member engaging with a part of said gears on its pitch line and with another part of said gears substantially only with the ends of its teeth, numeral keys, and means for controlling said toothed member from said numeral keys.

7. In an adding machine, the combination with a plurality of gears of approximately the same diameter but having different numbers of teeth, of a laterally movable gear adapted to coöperate directly with said first named gears, said laterally movable gear engaging with a portion of said first named gears on its pitch line and with another portion thereof beyond its pitch line, numeral keys, and means for controlling said laterally movable gear from said numeral keys.

8. In an adding machine, the combination with a plurality of gears of approximately the same diameter but having different numbers of teeth, a laterally movable gear adapted to coöperate directly with said first named gears, said laterally movable gear engaging with a part of said first named gears on its pitch line and with another part thereof substantially only with the ends of its teeth, numeral keys, and means for controlling said laterally movable gear from said numeral keys.

9. In an adding machine, the combination with a plurality of adding wheels corresponding to the numerical orders, of numeral keys for actuating said adding wheels carrying bars for said adding wheels, and a releasing bar slidingly mounted on one of said carrying bars.

10. In an adding machine, the combination with an adding wheel, of means for actuating said wheel, a plurality of auxiliary teeth carried by said wheel, a comb for returning said wheel to zero and engaging with a part only of said auxiliary teeth, and carrying bars released by said auxiliary teeth.

11. In an adding machine, the combination with an adding wheel, of means for actuating said adding wheel, a plurality of auxiliary teeth carried by said adding wheel, a comb for returning said adding wheel to zero and engaging with a part of said auxiliary teeth, a carrying bar for said adding wheel, and a releasing pawl slidingly mounted on said carrying bar and coöperating with said auxiliary teeth.

12. In an adding machine, the combination with an adding mechanism, of a translating device movable step by step to actuate said adding mechanism, keys controlling said translating device, and means for causing said translating device to remain in the same order during the movement of two of said keys.

13. In an adding machine, the combination with an adding mechanism of a translating device movable step by step to actuate said adding mechanism, a rack carried by said translating device, a feed pawl and a retaining pawl engaging with said rack, said rack being provided with a blank for said retaining pawl opposite one of teeth for the feed pawl, and numeral keys adapted to be placed successively into engagement with the adding device by said translating device.

14. In an adding machine, the combination with adding mechanism, of numeral keys, a translating device interposed between said numeral keys and adding mechanism, a lock for some of said keys controlled by said translating device, and a second lock for other of said keys also controlled by said translating device.

15. In an adding machine, the combination with an adding mechanism, of numeral keys, a translating device interposed between said numeral keys and adding mechanism, and a lock controlled by said translating device and movable into one position to lock a portion of said keys and into another position to lock other of said keys.

16. In an adding machine, the combination with an adding mechanism, of numeral keys, a translating device interposed between said numeral keys and adding mechanism, a lock controlled by said translating device for locking some of said numeral keys, and a second lock also controlled by said translating device, said second lock being movable into one position to lock a portion of said numeral keys and into another position to lock other of said numeral keys.

17. In an adding machine, the combination with adding mechanism, of numeral keys, a translating device interposed between said numeral keys and adding mechanism, a comb for locking said numeral keys, a rack carried by said comb, and a feed pawl engaging said rack and actuated by said translating device.

18. In an adding machine, the combination with an adding mechanism, of numeral keys, a translating device interposed between said adding mechanism and numeral keys, a comb movable into one position to lock a portion of said numeral keys and into another position to lock other of said numeral keys, a rack carried by said comb, a feed pawl engaging said rack, and means for operating said feed pawl from said translating device.

19. In an adding machine, the combination with an adding mechanism, of numeral keys, a translating device interposed between said numeral keys and adding mechanism, a comb movable in one position to lock a portion of the said numeral keys and into another position to lock other of said numeral keys, a rack carried by said comb, a feed pawl engaging said rack, means for operating said feed pawl from said translating device, and means for causing said translating device to remain in the same order during the operation of two of said numeral keys.

20. In an adding machine, the combination with an adding mechanism, of numeral keys, a translating device interposed between said adding mechanism and numeral keys, order keys for controlling the lateral movement of said translating device, a comb for locking said numeral keys, a rack carried by said comb, a feed pawl engaging said rack and actuated by said translating device, and means connected with said order keys for releasing said feed pawl.

In testimony whereof, I have hereunto set my hand and affixed my seal in the presence of the two subscribing witnesses.

G. N. HINCHMAN. [L. S.]

Witnesses:
W. A. ALEXANDER,
ELIZABETH BAILEY.